(12) United States Patent
Hunter

(10) Patent No.: US 10,997,757 B1
(45) Date of Patent: May 4, 2021

(54) METHOD OF AUTOMATED TYPOGRAPHICAL CHARACTER MODIFICATION BASED ON NEIGHBORING CHARACTERS

(71) Applicant: Mark Hunter, Jackson, NJ (US)

(72) Inventor: Mark Hunter, Jackson, NJ (US)

(73) Assignee: FlipScript, Inc.

( * ) Notice: Subject to any disclaimer, the term of this patent is extended or adjusted under 35 U.S.C. 154(b) by 529 days.

(21) Appl. No.: 14/307,479

(22) Filed: Jun. 17, 2014

(51) Int. Cl.
*G06T 11/60* (2006.01)

(52) U.S. Cl.
CPC ..................................... *G06T 11/60* (2013.01)

(58) Field of Classification Search
CPC . G06F 15/00; G06F 7/00; G06F 3/048; G06F 17/214; G06F 17/211; G06F 17/2223; G06F 17/2247; G06F 17/275; G06F 17/276; G09G 5/24; G06K 2209/01; G06K 2215/0028
USPC ......................................... 345/347, 468, 471
See application file for complete search history.

(56) References Cited

U.S. PATENT DOCUMENTS

| | | | | |
|---|---|---|---|---|
| 4,893,114 A * | 1/1990 | Ishii | ....................... | G09G 5/024 345/22 |
| 5,412,771 A * | 5/1995 | Fenwick | ............... | G06F 40/109 345/468 |
| 7,188,313 B2 * | 3/2007 | Hughes, Jr. | ........... | G06F 40/109 715/263 |
| 8,219,908 B2 * | 7/2012 | Napper | ............... | G06F 16/3332 715/268 |
| 2007/0116360 A1 * | 5/2007 | Jung | ..................... | G06K 9/3233 382/176 |
| 2014/0111522 A1 * | 4/2014 | Refstrup | ............... | G06T 11/203 345/468 |

* cited by examiner

*Primary Examiner* — Ming Wu
(74) *Attorney, Agent, or Firm* — Quickpatents, LLC; Kevin Prince

(57) ABSTRACT

A typography system modifies the shape of a subject character in a line of text based on neighboring characters to the left and right of the subject character. At least one font definition file comprises a plurality of character definitions that each represents one of the characters in the font. Each character definition includes a plurality of alternate forms that are each associated with at least one left neighboring character and at least one right neighboring character. A font adjustment module receives as an input a character to be output, at least one left neighboring character, and at least one right neighboring character. The font adjustment module then selects from the plurality of alternate forms a selected form that is associated with the at least one left neighboring character and the at least one right neighboring character. The font adjustment module then outputs the selected form of the character.

17 Claims, 5 Drawing Sheets

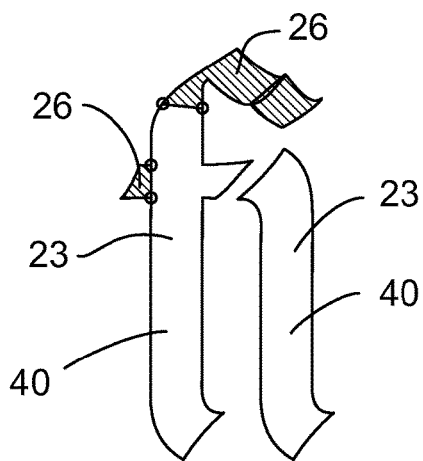
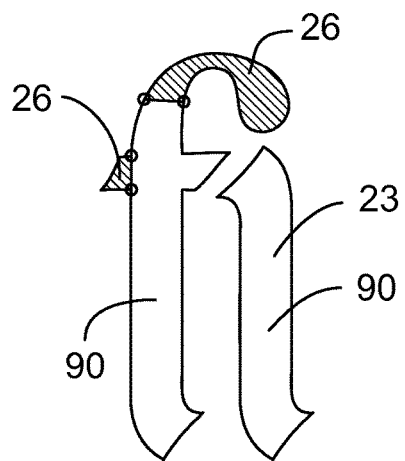
FIG. 2A
(PRIOR ART)
FIG. 2B
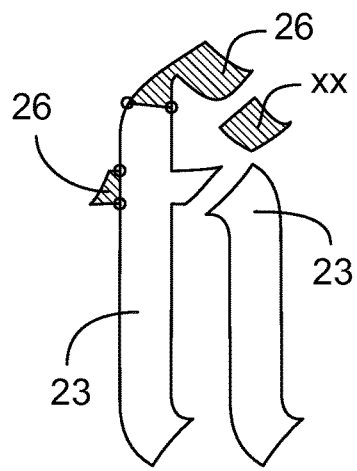
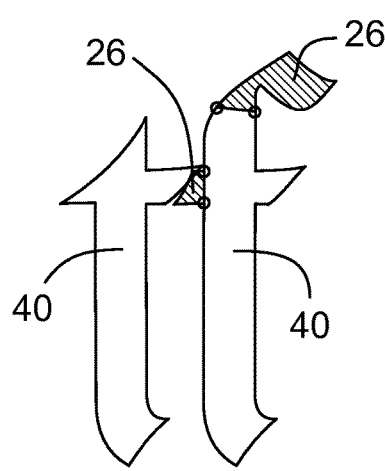
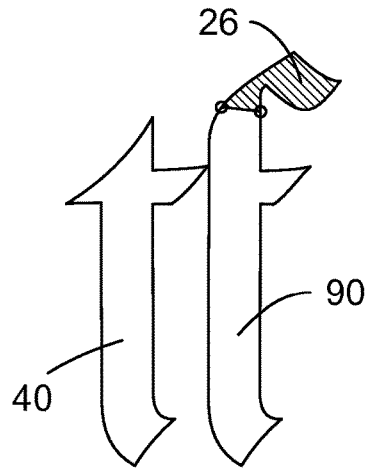
FIG. 2C
FIG. 3A
(PRIOR ART)
FIG. 3B

METHOD OF AUTOMATED TYPOGRAPHICAL CHARACTER MODIFICATION BASED ON NEIGHBORING CHARACTERS

CROSS-REFERENCE TO RELATED APPLICATIONS

Not Applicable.

STATEMENT REGARDING FEDERALLY SPONSORED RESEARCH AND DEVELOPMENT

Not Applicable.

FIELD OF THE INVENTION

This invention relates to typography, and more particularly to a method of automated typographical character modifications based on neighboring characters.

DISCUSSION OF RELATED ART

A ligature in typography is a single glyph representing two graphemes or letters. For example, the combination of letters f-i is often combined into a single character wherein the top "hood" of the f-character is exaggerated to include the "dot" of the i-character. Ligatures are helpful for increased readability and better aesthetics when flags, crossbars, hoods or other characteristics of one letter collide with flags, crossbars, hoods or other characteristics of a neighboring character. However, the use of ligatures is cumbersome and results in characters that are often not recognized by spelling or grammar checking applications. European Community publication EP0992006 to Ballard on Aug. 28, 2002, teaches such a system. Moreover, since there are potentially a large number of character combinations where readability would be improved with the use of ligatures, defining a ligature for each such combination is not practical. It is also impractical to define multiple ligatures for a single combination of letters. As a result, readability of many texts is diminished.

Therefore, there is a need for a system that allows for alternate forms of characters to be displayed based on their neighboring characters, both to the left and right, in order to improve readability of the characters overall. Such a needed system would allow for multiple alternate forms for a single combination of letters to add variety to the text, and would further have low system resource requirements. The present invention accomplishes these objectives.

SUMMARY OF THE INVENTION

The present device is a typography system for outputting a character in a typographical line containing a plurality of characters of a font, such as is displayed on a printed sheet, a display screen, or the like. At least one font definition file is stored on a storage medium and comprises a plurality of character definitions that each represents one of the characters in the font. Each character definition includes a plurality of alternate forms that are each associated with at least one left neighboring character and at least one right neighboring character. For example, if the character to the left of a subject character is a space, blank or other whitespace, and the character to the right of the subject character is a b-character, then at least one alternate form that is associated with such a combination is defined in the character definition.

A font adjustment module is stored on the storage medium and is adapted to receive an input of a character to be output from a source, such as a keyboard, mouse, text file, or other type of input. The font adjustment module is further adapted to receive at least one left neighboring character and at least one right neighboring character. The font adjustment module then selects from the plurality of alternate forms a selected form that is associated with the at least one left neighboring character and the at least one right neighboring character. The font adjustment module then outputs the selected form of the character.

The at least one left neighboring character is preferably just the left-most neighboring character, but may include multiple characters to the left of the subject character such as two, three, or more characters up to preferably the first space or other whitespace to the left of the subjection character. Likewise, the at least one right neighboring character is preferably just the right-most neighboring character, but may include multiple characters to the right of the subject character, such as two, three, or more characters up to preferably the first space or other whitespace to the right of the subject character.

Each alternate form of the character of the font is preferably a set of vector coordinates that represent the form of the character. In one embodiment of the invention, each alternate form of the plurality of characters in the font comprises elements that can be combined to create the finalized form.

The present invention is a system that allows for alternate forms of characters to be displayed based on their neighboring characters, both to the left and right, in order to improve readability of the characters overall. The present system allows for multiple alternate forms for a single combination of letters to add variety to the text, and has relatively minor system resource requirements. Other features and advantages of the present invention will become apparent from the following more detailed description, taken in conjunction with the accompanying drawings, which illustrate, by way of example, the principles of the invention.

DESCRIPTION OF THE DRAWINGS

FIG. 2A is a prior art depiction of the two characters F and I colliding;

FIG. 2B is an example of the system of the present invention modifying the form of the F and I characters of FIG. 2A to prevent the collision;

FIG. 2C is an alternate example of the system of the present invention modifying the form of the F and I characters of FIG. 2A to prevent the collision;

FIG. 3A is a prior art depiction of the two characters T and F colliding;

FIG. 3B is an example of the system modifying the form of the F character of FIG. 3A to prevent the collision;

DETAILED DESCRIPTION OF THE PREFERRED EMBODIMENT

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list. When the word "each" is used to refer to an element that was previously introduced as being at least one in number, the word "each" does not necessarily imply a plurality of the elements, but can also mean a singular element.

Figure 1:
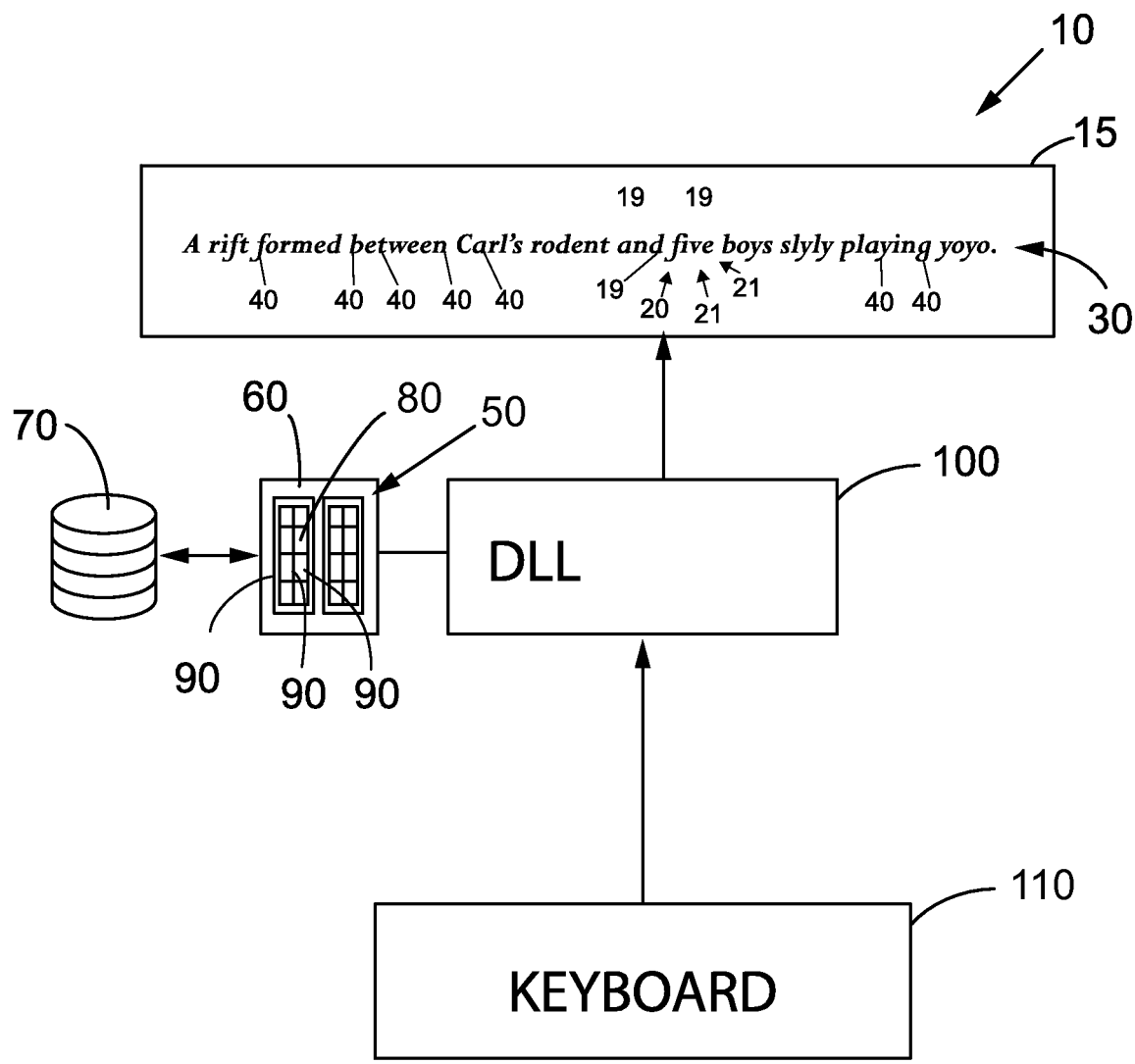
FIG. 1 is a diagram of the system of the invention.

FIG. 1 depicts a typography system 10 for outputting a character 20 in a typographical line 30 containing a plurality of characters 40 of a font 50. The output 15 may be a printed piece of paper, a display screen, or other visual media.

Figure 8A:
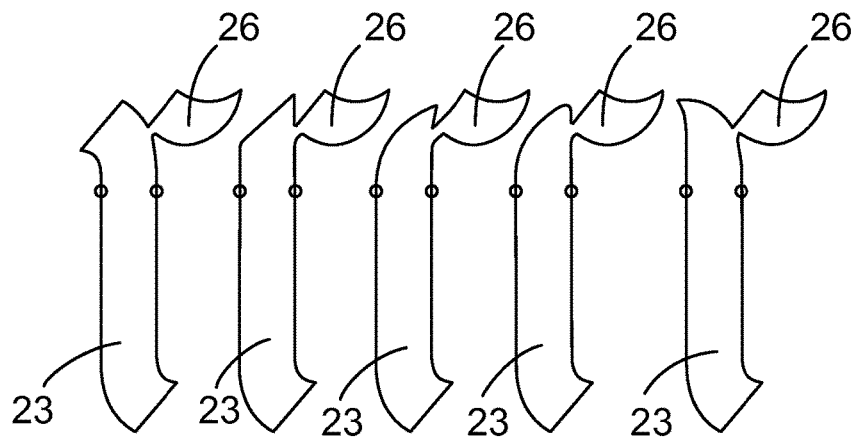
FIG. 8A is an example of alternate forms of a character.

At least one font definition file 60 is stored on a non-transitory computer-readable storage medium 70, such as a hard drive or computer ROM for example. The at least one font definition file 60 comprises a plurality of character definitions 80 (FIGS. 8A-8B) that each represent one of the characters 40 in the font 50. Each character definition 80 includes a plurality of alternate forms 90 (FIGS. 8A-8B) that are each associated with at least one left neighboring character 19 and at least one right neighboring character 21.

A font adjustment module 100 is stored on the storage medium 70 and is adapted to receive an input of a character to be output from a source 110, such as a keyboard, mouse, text file, or other type of input. The font adjustment module 100 is further adapted to receive at least one left neighboring character 19 and at least one right neighboring character 21. The font adjustment module 100 then selects from the plurality of alternate forms 90 a selected form 90 that is associated with the at least one left neighboring character 19 and the at least one right neighboring character 21. The font adjustment module 100 then outputs the selected form 90 of the character 20. The font adjustment module 100 may be a DLL-type resource file, for example, running in the background as a service of a computer operating system. Alternately each character in the at least one font definition file 60 may contain object-oriented code that is executed as soon as enough neighboring characters have been entered by the user.

The at least one left neighboring character 19 is preferably just the left-most neighboring character 19, but may include multiple characters 19 to the left of the subject character 20 such as two, three, or more characters up to preferably the first space to the left of the subjection character 20. Likewise, the at least one right neighboring character 21 is preferably just the right-most neighboring character 21, but may include multiple characters 21 to the right of the subject character 20, such as two, three, or more characters up to preferably the first space to the right of the subject character 20.

In one embodiment of the system 10, for each possible combination of the at least one left neighboring character 19 and the at least one right neighboring character 21, only one alternate form 90 of the character exists in the plurality of alternate forms 90. As such the font adjustment module 100 does not have to select between multiple associated alternate forms 90. However, in another embodiment, multiple alternate forms 90 for each combination of the at least one left neighboring character 19 and the at least one right neighboring character 21 may exist. In such an embodiment, the font adjustment module 100 may select one of the associated alternate forms 90 either sequentially by storing a previously-used alternate form 90 in the storage medium 70 and then incrementing to the next associated alternate form 90 accordingly. Alternately the font adjustment module 100 may select one of the associated alternate forms 90 randomly, or according to an algorithmic set of rules, such as a scoring or ranking mechanism.

Figure 8B:
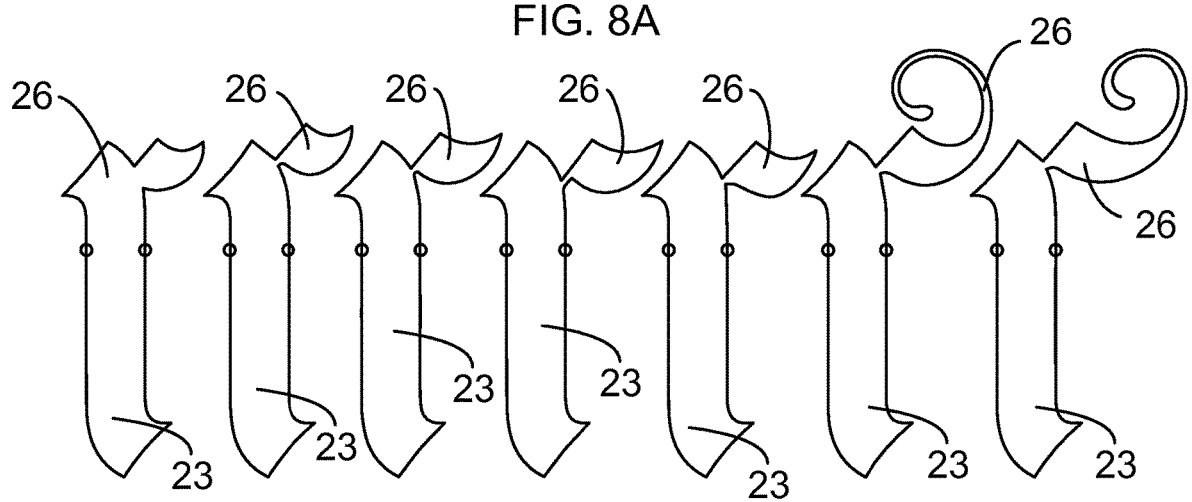
FIG. 8B is an example of alternate flags for use with a common character stem of a character.

Each alternate form 90 of the character 40 of the font 50 is preferably a set of vector coordinates that represent the form of the character 40. In one embodiment of the invention, each alternate form 90 of the plurality of characters 40 in the font 50 comprises multiple sub-forms, such as a stem portion 23 and a flag, hood or crossbar 26 (FIG. 8B). The sub-forms 23 are preferably stored separately in the at least one font definition file 60 from each other, the output character 20 comprising the combination of the selected sub-forms. In such an embodiment, the stem portions 23 of each character 40 of the font 50 may be stored in a first font definition file 60, and each flag portion 26 may be stored in another font definition file 60 that forms part of the font adjustment module 100, for example.

By way of example, FIG. 2A illustrates a common character collision with the character combination f-i. Often the hood 26 of the f-character infringes on the dot 26 of the i-character. The present system 10 may include an alternate form 90 of the i-character without the dot 26 (FIG. 2B). Similarly, a modified form 90 of the y-character may include the dot of the i-character (FIG. 4B). Further, an alternate form of the f-character may include an exaggerated and rounded hood 26 that suggests the dot of the i-character. Alternately, the hood 26 of the f-character may be raised to accommodate the dot 26 of the i-character (FIG. 2C).

Another common character collision occurs with the character combination t-f (FIG. 3A). A crossbar 26 of the f-character may be modified to accommodate the crossbar 26 of the t-character (FIG. 3B), for example.

Figure 4A:
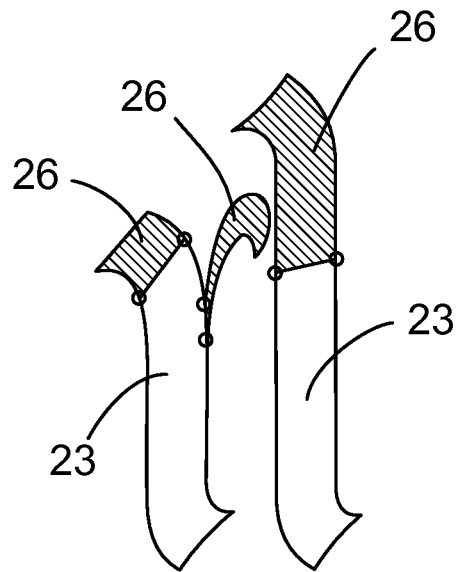
FIG. 4A is an example of the system modifying the form of the character Y to avoid collision with the character L.
Figure 4B:
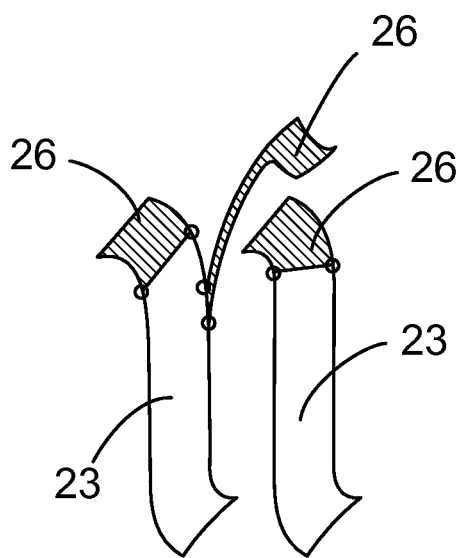
FIG. 4B is an example of the system modifying the form of the characters Y and I to avoid a collision therebetween.
Figure 5A:
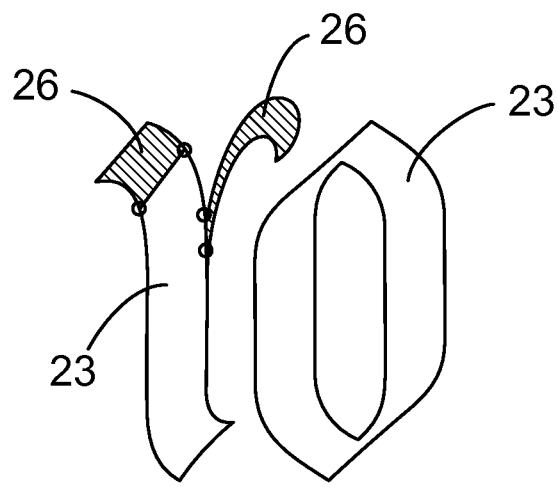
FIG. 5A is an example of the system modifying the form of the character Y to avoid a collision with the character O on the right.
Figure 5B:
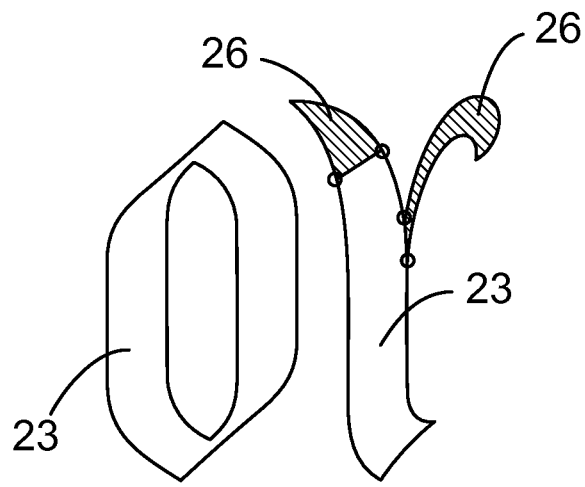
FIG. 5B is an example of the system modifying the form of the character Y to avoid a collision with the character O on the left.

Some characters with rightward-projection 26, such as the y-character, may include a modified form 90 having a truncated rightward-projection 26 when the right-most character 21 has a tall vertical stem 23, such as the l-character, for example (FIG. 4A). However, when next to characters that are rounded on their left-most side (such as a, c, e, o, g, or q for example), the rightward-projection 26 of the y-character may be extended further than normal (FIG. 5A). When the order of the characters of FIG. 5A are reversed, however, the left-hand arm 23 of the y-character may be modified to follow the form of the o-character (FIG. 5B).

Figure 6A:
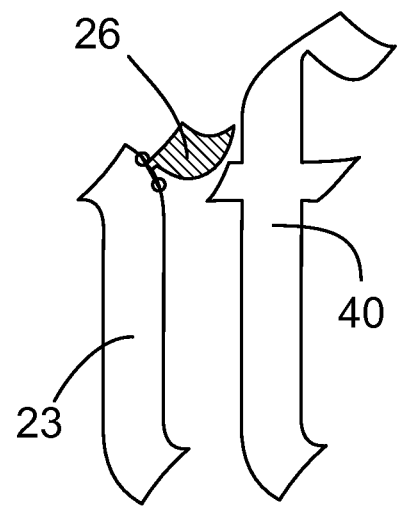
FIG. 6A is an example of the system modifying the form of the character R to avoid collision with the character F to the right.
Figure 6B:
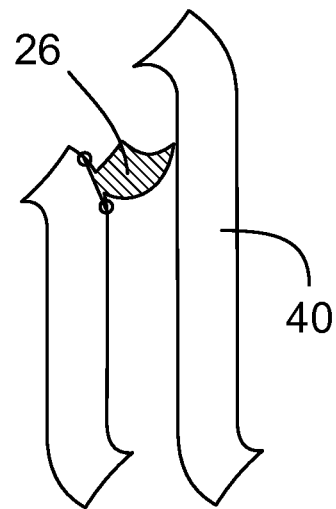
FIG. 6B is an example of the system modifying the form of the character R to avoid a collision with the character L to the right.
Figure 6C:
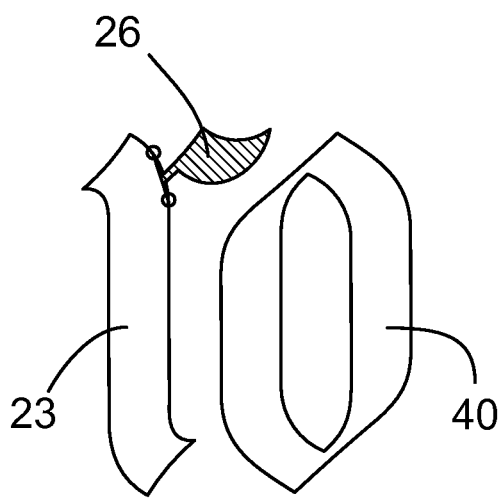
FIG. 6C is an example of the system modifying the form of the character R to avoid a collision with the character O to the right.
Figure 6D:
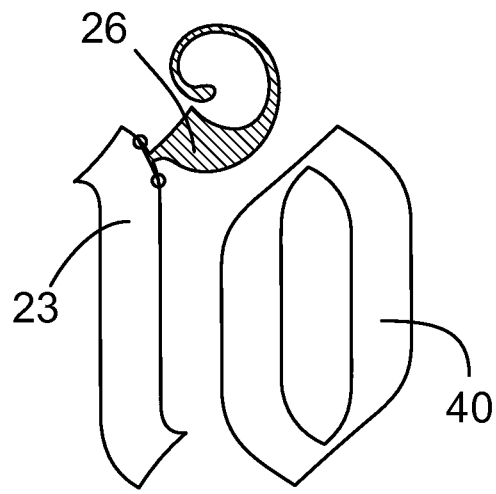
FIG. 6D is an example of the system modifying the form of the character R to provide a fanciful embellishment when to the left of a character such as the O character.

Similarly, FIG. 6A illustrates the flag 26 of the r-character elevated to make room for the crossbar 26 of the f-character. FIG. 6B illustrated the flag 26 of the r-character retracting to make room for the vertical stem 23 of the l-character, which would also be appropriate for characters such as b, h, k and I, for example. FIG. 6C illustrates an extended flag 26 on the r-character to accommodate the form of the right-most neighboring o-character 21. In one embodiment, the alternate form 90 may include an artistic embellishment if space to the right provides, such as the r-o combination of FIG. 6D.

Figure 7:
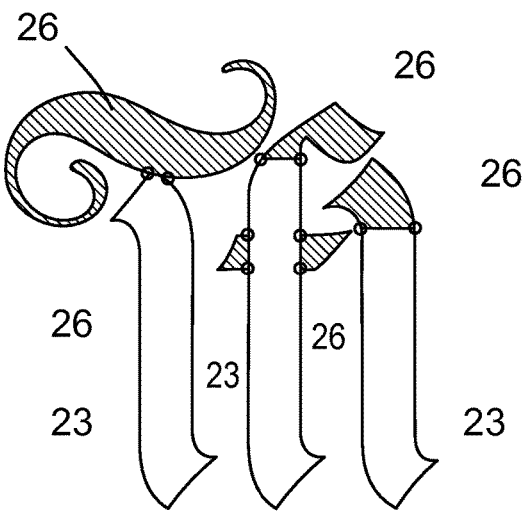
FIG. 7 is an example of the system modifying the form of the characters L based on more than one character to the left.

FIG. 7 shows a character combination where more than one left character 19 is used to determine the alternate form 90 of the subject character 20.

In use, while a user is typing a string of the characters 40 that spell the word "rift" for example, when the r-character is typed the font adjustment module 100 receives as an input the space, blank, carriage return or other whitespace character 19 that may precede the r-character, but does not have available the character 21 that is to the right of the r-character since it hasn't been typed yet. As such, the font adjustment module 100 may just output a standard r-character 20 while it waits for the next character to be typed. Once the i-character is typed, the font adjustment module 100 now has complete input for the r-character, and the alternate form 90 of the r-character may be displayed according to the alternate forms 90 available in the font definition file 60. As the typographical line 30 is completed, each character 20 is modified accordingly.

While a particular form of the invention has been illustrated and described, it will be apparent that various modifications can be made without departing from the spirit and scope of the invention. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. A typography system for outputting a character in a typographical line containing a plurality of characters of a font, comprising:

at least one font definition file stored on a non-transitory computer-readable storage medium, the at least one font definition file comprising a plurality of character definitions each representing one of the characters in the font, each character definition including a plurality of alternate forms, each of the plurality of alternate forms assembled from two or more subforms, each subform used to create the plurality of alternate forms, each of the plurality of alternate forms for each character of the font associated with at least one left-most neighboring character and at least one right-most neighboring character to make room for the at least one left-most neighboring character and the right-most neighboring character and to avoid collisions therebetween; and a font adjustment module stored on the non-transitory computer-readable storage medium and adapted to receive from a source the input of a character to be output, the at least one left-most neighboring character, and a right-most neighboring character, the font adjustment module, for each character, adapted to select, from the plurality of alternate forms, a selected form that is associated with the at least one left-most neighboring character and the at least one right-most neighboring character, the font adjustment module delivering the selected form as an output character to the user.

2. The typography system of claim 1 wherein each alternate form of each character of the font is a set of vector coordinates that represent the form of the character.

3. The typography system of claim 1 wherein for each possible combination of the at least one left-most neighboring character and the at least one right-most neighboring character, only one alternate form of the character exists in the plurality of alternate forms.

4. The typography system of claim 1 wherein for each possible combination of the at least one left-most neighboring character and the at least one right-most neighboring character, at least one matching alternate form of the character exists in the plurality of alternate forms, the font adjustment module further adapted to successively select each of the at least one matching forms.

5. The typography system of claim 1 wherein for each possible combination of the at least one left-most neighboring character and the at least one right-most neighboring character, at least one matching alternate form of the character exists in the plurality of alternate forms, the font adjustment module further adapted to randomly select each of the at least one matching forms.

6. The typography system of claim 1 wherein for each possible combination of the at least one left-most neighboring character and the at least one right-most neighboring character, at least one matching alternate form of the character exists in the plurality of alternate forms, the font adjustment module further adapted to algorithmically select each of the at least one matching forms.

7. The typography system of claim 1 wherein each alternate form of the plurality of characters in the font comprise separate sub-forms, the sub-forms being stored separately in the at least one font definition file, the output character comprising the combination of the sub-forms.

8. A processor-implemented method for modifying characters in a typographical line containing a plurality of characters of a font, the method comprising the steps:
   storing a font definition file on a non-transitory computer-readable storage medium, the font definition file comprising a plurality of character definitions each representing one of the characters in the font, each character definition including a plurality of alternate forms, each of the plurality of alternate forms assembled from two or more subforms, each subform used to create the plurality of alternate forms, each of the plurality of alternate forms for each character of the font associated with at least one left-most neighboring character and at least one right-most neighboring character to make room for the at least one left-most neighboring character and the right-most neighboring character and to avoid collisions therebetween;
   determining, for each of the characters, at least one matching form that is associated with at least one of the character appearing to the left of the character and with the character appearing to the right of the character;
   selecting one of the at least one matching forms; and
   outputting the selected form of the character.

9. The method of claim 8 further including the step:
   determining a next matching form from the at least one matching forms next in succession to output.

10. The method of claim 8 further including the step:
    determining one of the matching forms randomly to output.

11. The method of claim 8 further including the step:
    algorithmically determining one of the matching forms to output based on a set of rules, or a ranking or scoring system.

12. The method of claim 8 further including the step:
    allowing for each of the alternate forms of the plurality of characters in the font to be comprised of separate sub-forms which are stored separately in the at least one font definition file and combined to create the form to be output.

13. A non-transitory computer-readable storage medium storing a set of instructions that, when executed by a processor, cause the processor to perform operations comprising:
    providing a font definition file to the processor that comprises a plurality of character definitions each representing one of the characters in the font, each character definition including a plurality of alternate forms, each of the plurality of alternate forms assembled from two or more subforms, each subform used to create the plurality of alternate forms, each of the plurality of alternate forms for each character of the font associated with at least one left-most neighboring character and at least one right-most neighboring character to avoid collisions therebetween;
    determining, for each character, at least one matching form that is associated with at least one of the character appearing to the left of the character and with the character appearing to the right of the character;
    selecting one of the at least one matching forms; and
    outputting the selected form of the character.

14. The storage medium of claim 13 wherein the instructions further include the operation:
    determining a next matching form from the at least one matching forms next in succession to output.

15. The storage medium of claim 13 wherein the instructions further include the operation:
    determining one of the matching forms randomly to output.

16. The storage medium of claim 13 wherein the instructions further include the operation:
    algorithmically determining one of the matching forms to output.

17. The storage medium of claim 13 wherein the instructions further include the operation:
    allowing for each of the alternate forms of the plurality of characters in the font to be comprised of separate sub-forms which are stored separately in the at least one font definition file and combined to create the composite form.

\* \* \* \* \*